United States Patent [19]

Hara et al.

[11] Patent Number: 5,333,062
[45] Date of Patent: Jul. 26, 1994

[54] APPARATUS FOR INSTRUCTING THE HANDLING OF ABNORMALITIES AND MISOPERATIONS IN A FACSIMILE DEVICE

[75] Inventors: Kenji Hara; Mutsuhiro Karube; Kazuhiro Iihara; Shinichiro Nagoya; Akihito Yamauchi, all of Saitama, Japan

[73] Assignee: Fuji Xerox Co., Ltd., Tokyo, Japan

[21] Appl. No.: 757,029

[22] Filed: Sep. 9, 1991

[30] Foreign Application Priority Data

Sep. 10, 1990 [JP] Japan ................... 2-237144

[51] Int. Cl.⁵ ............................................. H04N 1/32
[52] U.S. Cl. .................................. 358/437; 358/439; 358/441
[58] Field of Search ............... 358/441, 406, 405, 437, 358/439, 434; 340/506, 692, 384 E, 286.11; 379/67, 68

[56] References Cited

U.S. PATENT DOCUMENTS 3,879,704 4/1975 Noji ..................................... 340/692
4,768,022 8/1988 Patterson ......................... 304/384 E

FOREIGN PATENT DOCUMENTS 159166 10/1982 Japan .
48305 5/1983 Japan .................... 358/441
63-31255 2/1987 Japan .
1-170259 7/1989 Japan .

Primary Examiner—Edward L. Coles, Sr.
Assistant Examiner—Scott A. Rogers
Attorney, Agent, or Firm—Finnegan, Henderson Farabow, Garrett & Dunner

[57] ABSTRACT

An abnormality-handling instructing apparatus for use in a facsimile machine where the operator is able to be properly noticed an abnormality so that an appropriate handling can be effected to the abnormality. The apparatus comprises memory for storing abnormality codes and remedies for the abnormalities; an abnormality code generator for generating an abnormality code in accordance with an abnormality; and abnormality-handling instructing device for reading out the data from the memory in accordance with occurred abnormality and for outputting remedy in characters on the basis of the data.

2 Claims, 5 Drawing Sheets

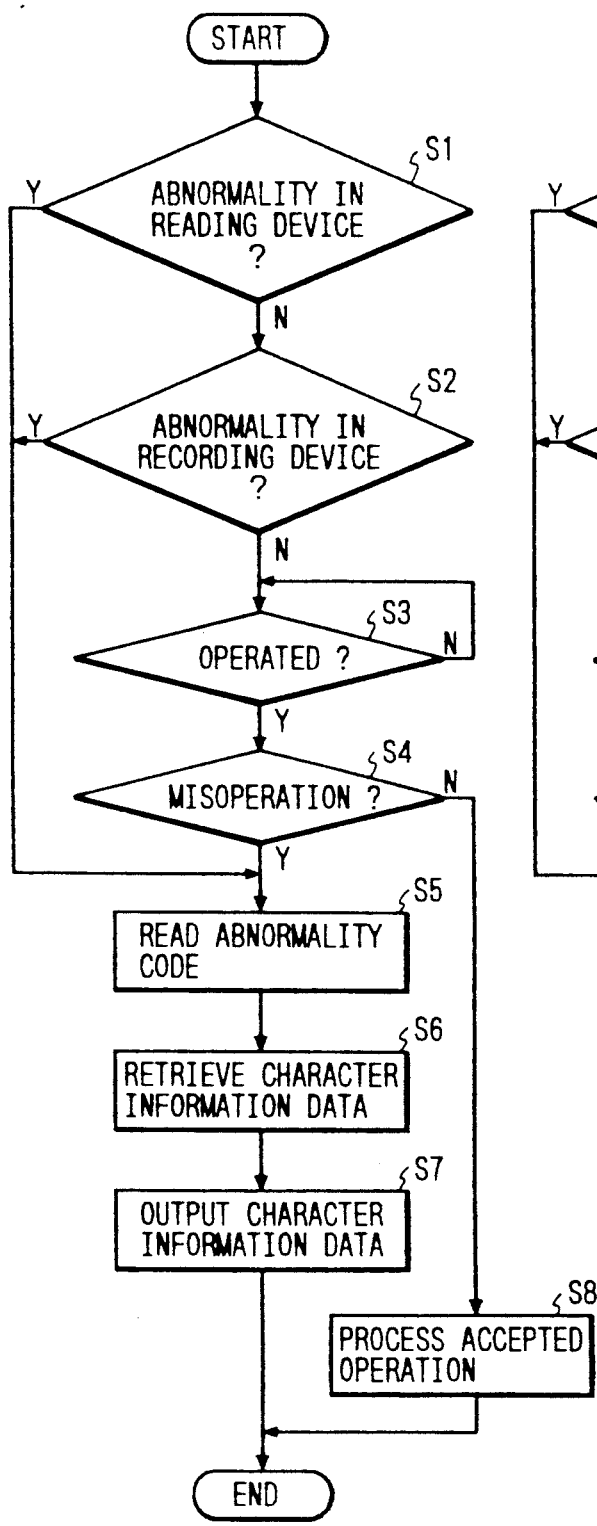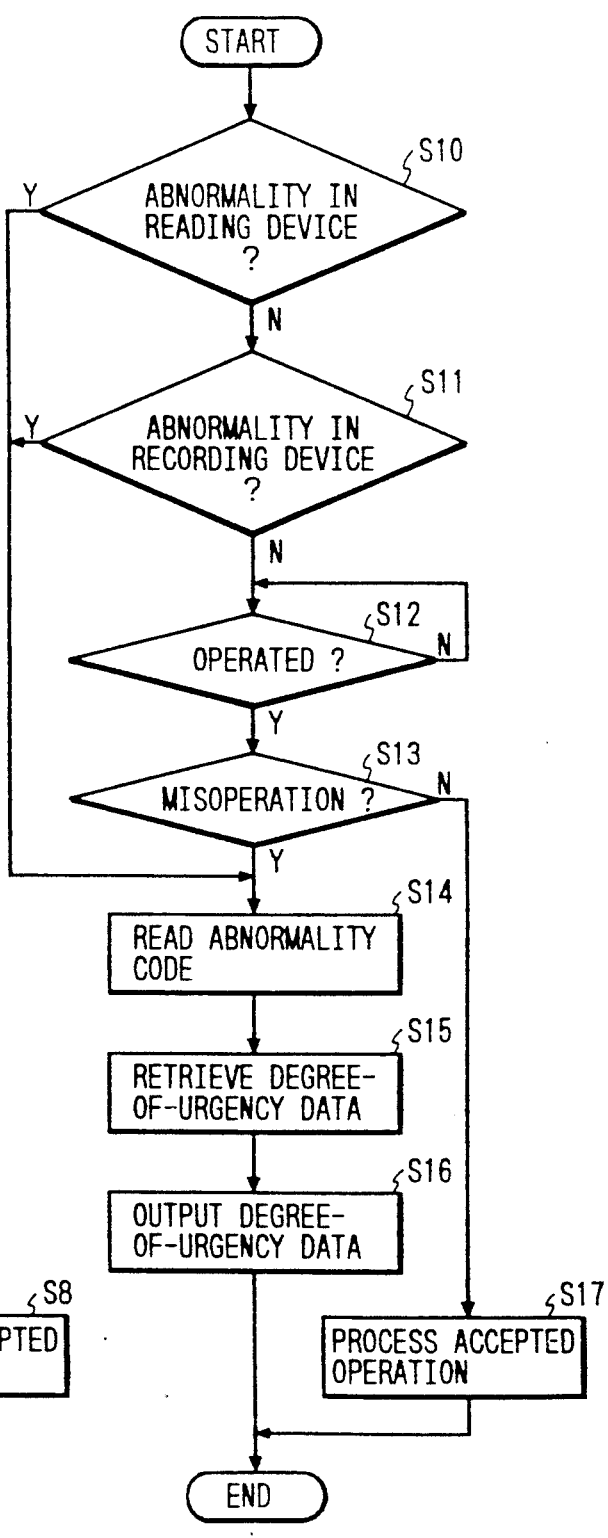

FIG. 9

| ABNORMALITY CODE | CHARACTER INFORMATION DATA | |
|---|---|---|
| 1000 | RECORDING PAPER JAMMING | : SEE PAGE ○○ OF MANUAL |
| 1010 | ORIGINAL JAMMING | : SEE PAGE △△ OF MANUAL |
| 1020 | NO RECORDING PAPER | : SEE PAGE ×× OF MANUAL |

FIG. 10

| ABNORMALITY CODE | CHARACTER INFORMATION DATA |
|---|---|
| 1010 | ORIGINAL IS JAMMED OPEN COVER OF READER AND REMOVE ORIGINAL |
| 1100 | RECEIVING END IS NOT READY RESET AND TRY AGAIN |

FIG. 11

| ABNORMALITY CODE | DEGREE-OF-URGENCY DATA | | |
|---|---|---|---|
| | INTERMITTENCE DATA | TONE DATA | VOLUM DATA |
| 1000 | 0 | 0 | 0 |
| 1010 | 0 | 0 | 1 |
| 1020 | 0 | 1 | 0 |
| 1030 | 0 | 1 | 1 |
| 1040 | 1 | 0 | 0 |

APPARATUS FOR INSTRUCTING THE HANDLING OF ABNORMALITIES AND MISOPERATIONS IN A FACSIMILE DEVICE

BACKGROUND OF THE INVENTION

The present invention relates to an abnormality-handling instructing apparatus, and more particularly to an abnormality-handling instructing apparatus for a facsimile apparatus.

There have been proposed control systems for facsimile apparatuses and facsimile communication systems where errors in input operation and abnormalities of a reader and a recorder are detected to inform the occurrence of the abnormalities to the facsimile operator.

For example, Japanese Published Patent Application No. 1-170259 proposes a control system for a facsimile apparatus where a voice message is outputted to inform the occurrence of an abnormality to the facsimile operator if the apparatus fails to carry out a predetermined sequence of operations.

Meanwhile, Japanese Published Patent Application No. 62-31255 proposes a facsimile communication system where abnormality information in the form of a facsimile signal is sent to a transmitter side if an abnormality is detected at the receiver side.

The aforementioned prior art apparatuses suffer from the following drawbacks.

With a system where an abnormality is informed with a voice message, the operator is able to recognize the occurrence of an abnormality but does not know how he must handle the abnormality. Further, the provision of voice messages not only necessitates complex construction of the apparatus but also requires a large memory capacity for storing the messages. This leads to higher cost of the apparatus.

With a system where abnormality information is outputted in the form of a facsimile signal, if the signal is not being transmitted in the automatic mode but in the manual mode where the operator is carrying out the transmission procedure while monitoring the facsimile operation, the operator at the transmitter side cannot understand what the information means since it is in the form of a facsimile signal.

Thus, the manual transmission mode suffers from the problem that the operator is unable to properly handle the abnormality.

SUMMARY OF THE INVENTION

An object of the invention is to provide an abnormality-handling instructing apparatus where the operator is able to be properly noticed an abnormality so that an appropriate handling can be effected to the abnormality, where by solving the aforementioned problem.

To solve the aforementioned subject, a first aspect of the invention is characterized by:

memory means for storing abnormality codes indicative of kinds of abnormalities of a facsimile apparatus and errors in operating the facsimile apparatus, and for storing data from which remedies are indicated in the form of characters;

means for generating individual abnormality codes in accordance with abnormalities and operator's misoperations of the facsimile apparatus;

abnormality-handling instructing means for reading out the data from the memory means in accordance with an abnormality so as to output characters in accordance with the data.

A second aspect of the invention is characterized by means for storing abnormality codes indicative abnormalities and operator's misoperations together with data indicative of degrees of urgency of handling abnormalities and operator's misoperations;

means for outputting an abnormality code for each of abnormalities and operator's misoperations when the abnormalities and operator's misoperations occur;

means for reading out the data from the memory means in accordance with the abnormality code and for outputting a alarming sounds in accordance with the degree of urgency of the abnormality code.

Further, a third aspect of the invention is characterized by;

abnormality information storing means for storing an abnormality information in the form of an image signal as well as in the form of a voice signal that are sent to the transmitter side;

transmission mode determining means for determining whether the transmitter side is in the automatic transmission mode or in the manual transmission mode;

means for reading out the abnormality information from the memory means to send an abnormality information to the transmitter side according to the result of the transmission mode determining means when abnormality occurs, the abnormality information being in the form of an image signal when the transmitter is in the automatic transmission mode, the abnormality information being in the form of a voice signal when the transmitter is in the manual transmission mode.

According to the present invention of the aforementioned construction, the first aspect permits to specifically notice the operator the occurrence of the abnormality by character information.

The second feature allows the operator to recognize the degree of urgency in handling abnormality and the operator is able to carry out suitable procedures in accordance with the degree of urgency.

The third feature permits to have the sending end recognized the abnormality occurring at the receiving end regardless of whether the transmitter is in the automatic mode or in the manual mode.

BRIEF DESCRIPTION OF THE DRAWINGS

FIG. 5 is a flowchart illustrating the operation of the first embodiment;

FIG. 6 is a flowchart illustrating the operation of the second embodiment;

FIG. 9 and 10 are diagrams showing an example of data stored in an abnormality information memory; and FIG. 11 is a diagram showing an example of data stored in a degree-of-urgency information memory.

PREFERRED EMBODIMENTS OF THE INVENTION

Figure 4:
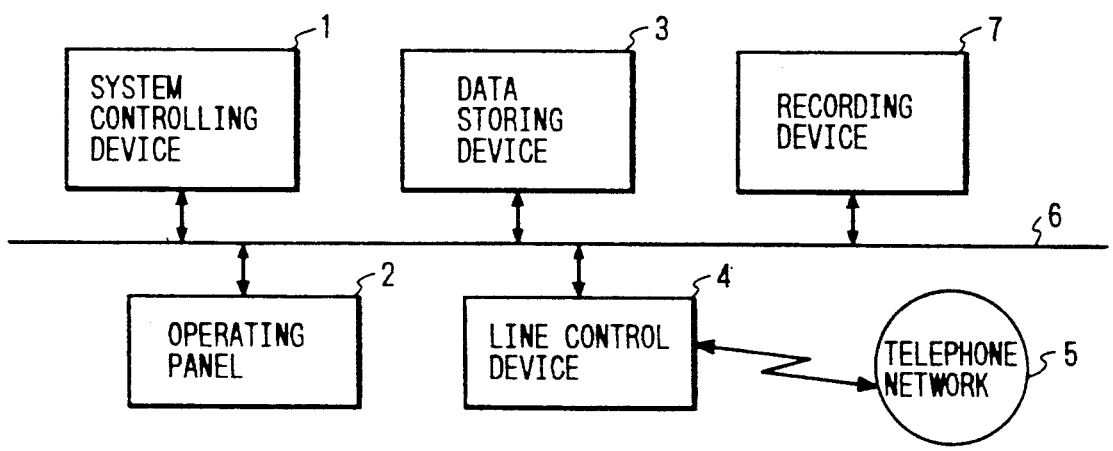
FIG. 4 is a block diagram showing the essential part of hardware construction of a facsimile apparatus.

The present invention will now be described with reference to the drawings. FIG. 4 is a block diagram of a hardware construction of an embodiment of a facsimile apparatus according to the present invention.

In the figure, a system bus 6 is connected to a system controller 1 provided with a CPU and a ROM, an operating panel 2 for inputting commands into the system controller 1, a data memory 3 consisting of an IC memory and a hard disk drive used for storing therein data necessary for the operation of system controller 1 as well as transmitted and received data, a recorder 7 for printing out the received data and information stored in the data memory 3, and a line controller 4 for transmitting and receiving the image signal and for controlling protocol.

A facsimile apparatus having the aforementioned construction is connected with a telephone network 5 for transmitting and receiving desired image information.

Figure 1:
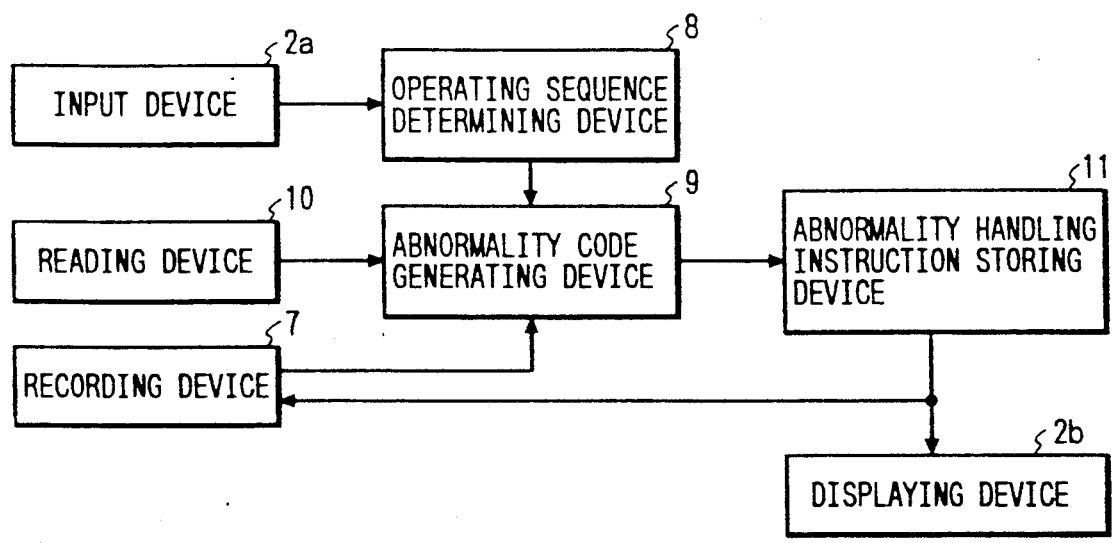
FIG. 1 is a functional block diagram showing a first embodiment of the present invention.

The function of essential parts of the embodiment will now be described. FIG. 1 is a block diagram showing the function of essential parts of the embodiment.

In the figure, an input device 2a has a plurality of keys on the operation panel 2. The respective keys are used to generate operation codes corresponding thereto.

A operating sequence determining section 8 compares the operation codes supplied from the input device 2a with a predetermined operation procedure to determine whether the key operation has been carried out in accordance with the predetermined procedure. The result is inputted into an abnormality code generator 9 which in turn generates an abnormality code corresponding to an abnormal key operation.

The abnormality code generator 9 receives abnormality signals of the abnormal feeding of an original detected by a reader 10 or of the abnormal feeding of a record sheet detected by a recorder 7, and generates an abnormality code corresponding to the signal indicating the abnormality.

An abnormality-handling-instruction memory 11 stores therein the abnormality codes and character data that specify abnormality handling. When the abnormality code is supplied to the abnormality-handling-instruction memory 11, the abnormality-handling-instruction memory 11 retrieves the character data indicative of abnormality-handling instruction corresponding to the abnormality code from the table, and sends it to a display 2b and a recorder 7.

If operator's misoperation of keys and all other possible abnormalities, which may occur at the reader 10 and recorder 7, are to be noticed, it is most preferable that the character data indicative of abnormality is sent to both the display 2b and recorder 7. However, the procedure may be simplified by sending the character data only to the display 2b so that at least operator's misoperations and abnormalities in the reader 10 are noticed to the operator.

FIGS. 9 and 10 show tables stored in the abnormality-handling instruction memory 11.

The table shown in FIG. 9 includes character data corresponding to the abnormality codes, for example, the contents of abnormality such as the jamming of record paper, jamming of original copies, and corresponding pages of the instruction manual that describes the procedure for the remedy of the abnormalities.

Meanwhile, the table in FIG. 10 includes character data corresponding to the abnormalities that present the contents of abnormality and specific instructions for solving those abnormalities.

The operation of the embodiment will now be described as follows with reference to the flowchart shown in FIG. 5.

In FIG. 5, at step 1, a decision is made based on whether the reader 10 has any abnormality. If not, the program proceeds to step 2 where it is determined whether the recorder 7 has any abnormality.

If either the reader 10 or the recorder 7 has abnormality, the program jumps from step 1 or step 2 to step 5.

If neither the reader 10 nor the recorder 7 has abnormality, the program shifts to step 3 where the program waits for operator's misoperation.

At step 3, if it is determined that the operator has done some operations such as key operation on the input device 2a and setting of original copies, etc., then the program proceeds to step 4 where it is determined whether the aforementioned operations by the operator were performed in accordance with a predetermined operation procedure, i.e., to see if operator's misoperation occurred. If there is no mistake made by the operator, then the operator's operation is accepted at step 8 where signal processing is performed in accordance with that operation. If there is any mistake detected, then the program proceeds to step 5.

At step 5, the abnormality codes corresponding to the abnormalities of reader 10 and recorder 7 and operator's misoperations are generated.

At step 6, the character information data corresponding to the abnormality codes are read out of the abnormality handling instruction memory 11.

At step 7, the character information data are outputted to the display 2b and recorder 7.

According to the present invention as mentioned above, when the abnormality in the reader 10 and recorder 7 and operator's misoperation are detected, specific remedy is outputted to the display 2b and/or recorder 7 so as to eliminate that abnormality.

Figure 2:
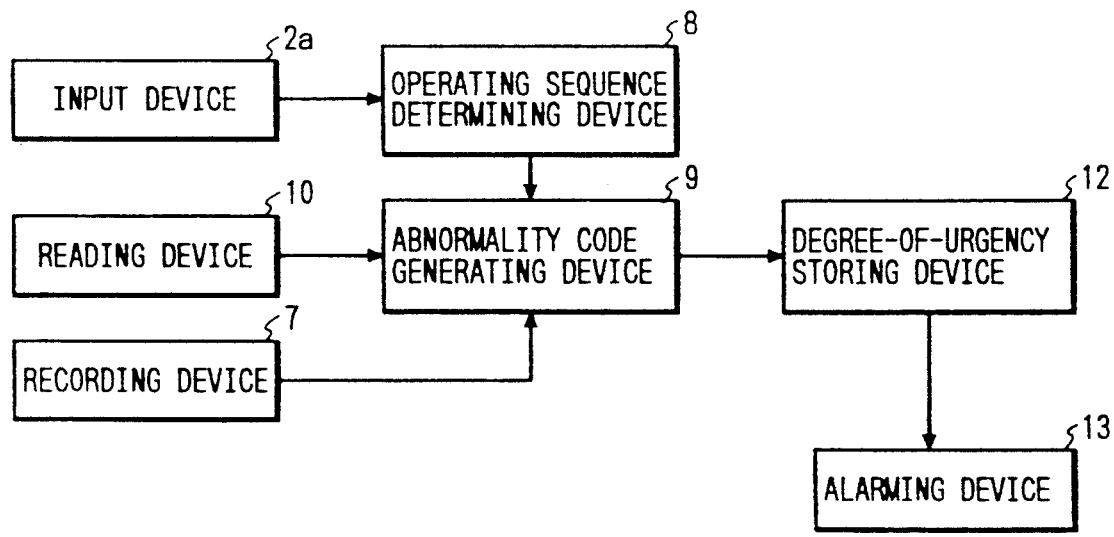
FIG. 2 is a functional block diagram showing a second embodiment of the present invention.

A second embodiment of the invention will now be described as follows:

FIG. 2 is a block diagram showing essential functions of the second embodiment and the same references as in FIG. 1 represent the same or similar elements.

Referring to the figure, abnormality codes and degree-of-urgency data corresponding to those abnormality codes are stored in a degree-of-urgency information memory 12. An alarm 13 is a speaker or a buzzer, etc., which radiates sounds in variable loudness, variable frequency, and intermittence. The alarm 13 produces a sound in accordance with the degree-of-urgency data supplied from the degree-of-urgency information memory 12. FIG. 11 shows an example of the degree-of-urgency data stored in the degree-of-urgency information memory 12.

As shown in FIG. 11, the respective abnormality codes are assigned the degree of urgency which are classified in two levels of ratio of intermittence, frequency of sound, and volume of sound.

In the second embodiment, the degree of urgency data of "111" indicates that an abnormality with the highest degree-of-urgency has occurred, where the sound has a shorter interval time, higher frequency tone, and larger volume.

For example, an abnormality represented by an abnormality code "1010" corresponds to the degree-of-urgency data "001." In which case, the sound having a longer interval time, lower frequency, and larger volume is outputted from the alarm 13.

The operation of the second embodiment will be described with reference to the flowchart shown in FIG. 6.

In the figure, the operations in steps 10-14 and 17 are the same as those in Step 1-5 and 8 in FIG. 5.

At step 15, the degree-of-urgency data corresponding to the abnormality code is retrieved from the degree-of-urgency information memory 11.

At step 16, the retrieved degree-of-urgency data is outputted to the alarm 13 which in turn generates an alarm sound in accordance with the degree-of-urgency data.

According to the second embodiment as mentioned above, each degree-of-urgency data is assigned a unique degree of urgency to return to the normal operation, so that an alarm sound is radiated in accordance with the degree of urgency.

Therefore, the degree of urgency is noticed to the operator in terms of variation of alarm sound depending on the degree of urgency.

A third embodiment of the invention will now be described.

In the third embodiment, the abnormality at the receiving end is noticed to the transmitting end.

Figure 3:
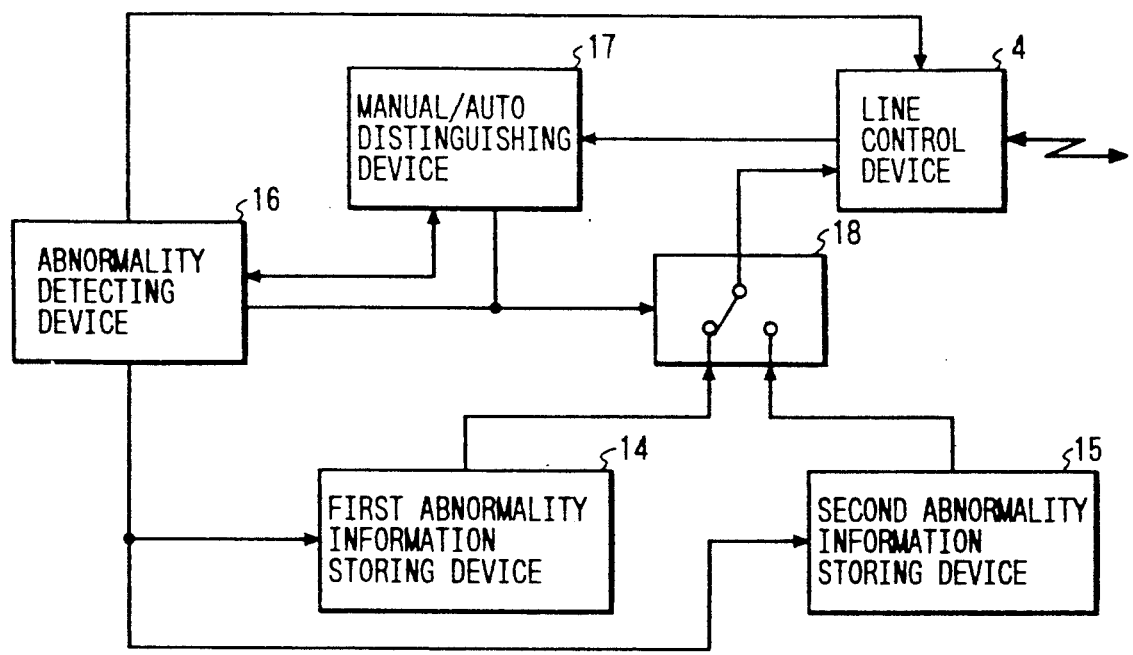
FIG. 3 is a functional block diagram showing a third embodiment of the present invention.

FIG. 3 is a block diagram showing essential part of the receiving end.

In the figure, abnormality codes and image signals indicative of kinds of abnormality are stored in a first abnormality-information memory 14, and abnormality codes and voice signals indicative of kinds of abnormality are stored in a second abnormality-information memory 15.

An abnormality detector 16 detects the condition of unable reception due to the fact that the paper is jammed, the paper is run out, and image-signal memory is full of image signal, etc.

When the abnormality detector 16 detects an abnormality, a signal which causes the transmitter to be switched to the receiving mode is transmitted to the transmitter side. This signal is outputted only when a manual/auto distinguishing section 17 determines that the "call" by the transmitter side is made in the auto mode.

The manual/auto distinguishing section 17 determines whether the "call" is made in the manual mode or in the auto mode. This decision is made in terms of the presence or absent of a ring back tone CNG(a signal of 1000 Hz).

A switch 18 is responsive to the result outputted by the manual/auto distinguishing section 17 so as to shift to the position of the first abnormality-information memory 14 in the auto mode, and to the position of the second abnormality-information memory 15 in the manual mode. By the aforementioned construction, when abnormality detector 16 detects an abnormality such that the signal cannot be received normally, the abnormality is noticed to the transmitter side either in an image signal or in a voice signal on the basis of the result outputted by the manual/auto distinguishing section 17.

The operation of the third embodiment will now be described with reference to the flowchart shown in FIG. 7.

Figure 7:
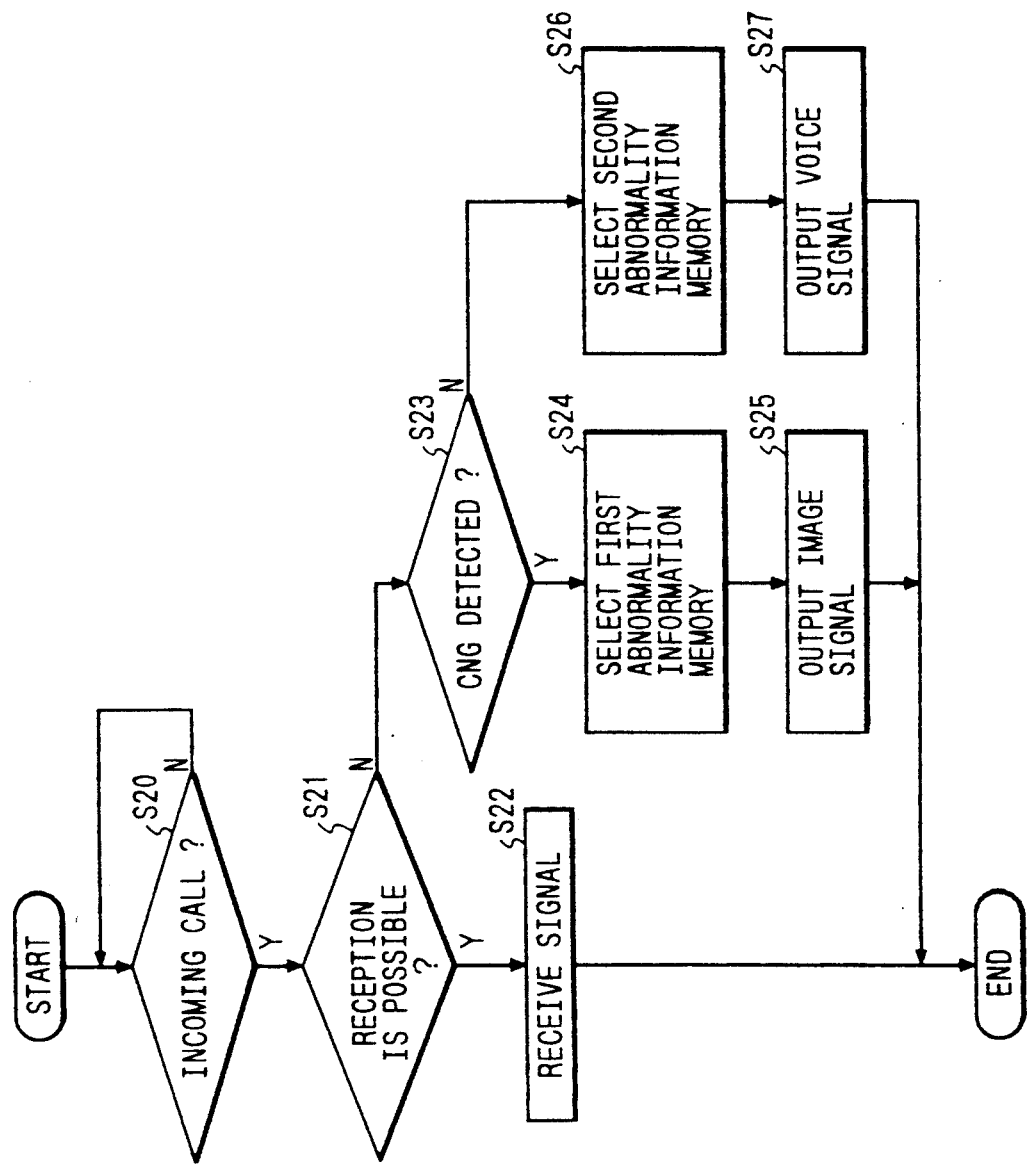
FIG. 7 is a flowchart illustrating the operation of the third embodiment.

In FIG. 7, an incoming call is monitored at step 20. When there is an incoming call, the program proceeds to step 21 where it is determined whether the reception is possible or not. If the abnormality detector 16 has not detected abnormality, the reception is possible and therefore the program proceeds to step 22 so as to receive the signal.

Alternatively, if abnormality has been detected by the detector 16, the result of the step 21 is NO and the program proceeds to step 23.

At step 23, it is determined whether the transmitter side is in the auto mode or in the manual mode in accordance with the presence and absence of a ring back tone CNG. If the transmitter is in the auto mode, program proceeds to step 24 where the switch 18 is shifted to the position of the first abnormality-information memory 14. At step 25, a predetermined image signal is outputted in accordance with the kind of abnormality from the first abnormality-information memory 14 through the line controller 4 to the line of the network.

At step 23, if it is determined that the transmitter side is in the manual mode, then the program proceeds to step 26 where the switch 18 is switched to the position of the second abnormality-information memory 15.

At step 27, a predetermined voice signal is outputted in accordance with the kind of abnormality from the second abnormality-information memory 15 through the line controller 4 to the line of the network.

Figure 8:
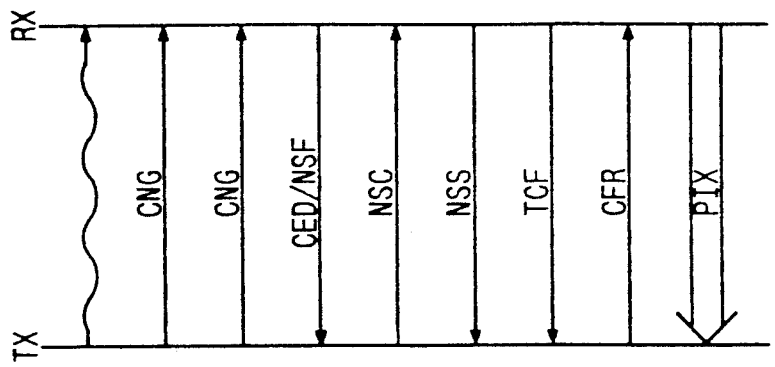
FIG. 8 is a sequence diagram showing an example for protocol of the third embodiment.

FIG. 8 shows an example of protocol of the abovedescribed operation.

In the figure, upon detecting the ring back tone CNG, the receiving end RX outputs a called station identification CED and a non-standard function NSF.

When reception is unable due to the occurrence of abnormality, the transmitter side TX is noticed the abnormality of reception by an error-information added to a specific bit of the non-standard function NSF. Upon detecting the abnormality of reception, the transmitter side TX is switched to the receiving mode and transmits a non-standard function command NSC.

Then, the receiving side RX transmits the non-standard function setting NSS and a training check TCF, detects a ready-to receive confirmation CFR, and then reads the image signal, PIX from the first abnormality-information memory 14 so as to transmit it to the transmitter side TX.

The above description is the sequence of automatic transmission.

When the transmitter side TX is in the manual mode, that is, when the ring back call CNG is not detected a predetermined time after arrival of signal from the transmitter side, the aforementioned sequence is not performed but the voice signal is immediately read out of the second abnormality-information memory 15 and is then sent to the transmitter side TX.

As mentioned above, in the third embodiment, when it is determined that the receiving side has an abnormality so that normal reception cannot be performed, the transmitter is noticed the occurrence of abnormality either by means of the image signal or the voice signal, depending on whether the transmission is in the auto mode or in the manual mode.

As is apparent from the above description, the invention provides the following advantages.

(1) The operator or user is noticed the occurrence of abnormality and the remedy for that abnormality by character information.

(2) Depending on the kinds of abnormality, the degrees of urgency to return to the normal condition are set. Thus, the operator is able to recognize the seriousness of the abnormality by the alarm sound provided in accordance with the degree of urgency, so that a proper measure can be taken.

(3) The receiving end can notice the occurrence of abnormality and the content thereof to the transmitter end whether the transmission is in the auto made or in the manual mode. Thus, the transmitter end can take most appropriate measure in accordance with the content of the notice.

What is claimed is:

1. An abnormality-handling instructing apparatus for use in facsimile, comprising:

abnormality information memory means for storing abnormality codes indicative abnormalities and operator's misoperations together with abnormality information in the form of an image signal and in the form of a voice signal, said abnormality information being sent to a transmitter side;

transmitter-condition determining means for determining whether the transmitter is in an automatic mode or in a manual mode;

means for generating abnormality codes in accordance with an abnormality or an operator's misoperation when abnormality or operator's misoperation of the facsimile occurs; and control means for reading out said abnormality information in the form of the image signal according to the abnormality code if the transmitter is in the automatic mode, and for reading out said abnormality information in the form of the voice signal according to the abnormality code if the transmitter is in the manual mode, said image signal and said voice signal read from said memory means being sent to the transmitter to notify the occurrence of abnormality at receiving end.

2. The apparatus as claimed in claim 1, wherein said abnormality information memory means comprises first memory for storing abnormality codes and corresponding image signals indicative of kinds of abnormality and second memory for storing abnormality codes and corresponding voice signals indicative of kinds of abnormality; and wherein said control means comprises switching means for selecting said first memory when the transmitter is in automatic mode, and for selecting said second memory when the transmitter is in manual mode.

* * * * *